United States Patent [19]

Alger et al.

[11] Patent Number: 5,168,393
[45] Date of Patent: Dec. 1, 1992

[54] COPPER VAPOR LASER MODULAR PACKAGING ASSEMBLY

[75] Inventors: Terry W. Alger, Tracy; Earl R. Ault, Dublin; Edward I. Moses, Castro Valley, all of Calif.

[73] Assignee: United States Department of Energy, Washington, D.C.

[21] Appl. No.: 298,810

[22] Filed: Jan. 18, 1989

Related U.S. Application Data

[63] Continuation of Ser. No. 903,406, Sep. 2, 1986, abandoned.

[51] Int. Cl.⁵ ............................................. H01S 3/00
[52] U.S. Cl. ..................................... 359/333; 372/109
[58] Field of Search .................... 330/4.3; 372/109, 55, 372/56, 65

[56] References Cited

U.S. PATENT DOCUMENTS

| | | | |
|---|---|---|---|
| 3,771,067 | 11/1973 | Kohl et al. | 372/109 |
| 3,906,398 | 9/1975 | Low et al. | 372/56 X |
| 4,027,273 | 5/1977 | Yang | 330/4.3 |
| 4,313,093 | 1/1982 | Suenaga et al. | 372/109 |
| 4,357,649 | 11/1982 | LaCroix | 372/109 X |
| 4,357,705 | 11/1982 | Hodson | 372/109 |
| 4,379,203 | 4/1983 | Koszytorz | 372/109 X |
| 4,457,001 | 6/1984 | Sepp et al. | 372/109 X |
| 4,612,648 | 9/1986 | Peterson et al. | 372/109 |
| 4,646,336 | 2/1987 | Koseki | 372/65 X |
| 4,660,209 | 4/1987 | Osada et al. | 372/65 X |

FOREIGN PATENT DOCUMENTS

| | | | |
|---|---|---|---|
| 2437855 | 2/1976 | Fed. Rep. of Germany | 372/65 |
| 0087887 | 5/1983 | Japan | 372/109 |

*Primary Examiner*—Mark Hellner
*Attorney, Agent, or Firm*—Miguel A. Valdes; Henry P. Sartorio; William R. Moser

[57] ABSTRACT

A modularized packaging arrangement for one or more copper vapor lasers and associated equipment is disclosed herein. This arrangement includes a single housing which contains the laser or lasers and all their associated equipment except power, water and neon, and means for bringing power, water, and neon which are necessary to the operation of the lasers into the container for use by the laser or lasers and their associated equipment.

4 Claims, 1 Drawing Sheet

COPPER VAPOR LASER MODULAR PACKAGING ASSEMBLY

FIELD OF THE INVENTION

The United States Government has rights in this invention pursuant to Contract No. W-7405-ENG-48 between the United States Department of Energy and the University of California for the operation of the Lawrence Livermore National Laboratory.

This is a continuation of application Ser. No. 903,406 filed Sep. 2, 1986, abandoned Feb. 27, 1989.

BACKGROUND OF THE INVENTION

The present invention relates generally to copper vapor lasers and more particularly to a modularized packaging arrangement for these types of lasers and their associated operating equipment.

The typical copper vapor laser (CVL) of the type to which the present invention pertains requires certain necessary operating equipment, apart from the laser itself, including specifically a switch and power supply (one unit), a pulsed power unit (a second unit), and a computer (a third unit). In addition, this particular laser, like all copper vapor lasers, require a primary supply of electrical power, water and neon. It is to be understood that both this laser and its associated operating equipment are well-known in the art and do not form part of the present invention, except in combination with the packaging technique to be described hereinafter. As a result, neither the laser itself nor its associated operating equipment including its switch and power supply, its pulsed power unit and its computer will be described herein.

Heretofore, copper vapor lasers of the type recited immediately above have been sufficiently small (in power requirements) so as to allow their associated operating equipment to be positioned at remote locations. More recently, these copper vapor lasers have been developed with increasing power requirements. As a result, it has become important to physically place the associated operating equipment closer and closer to the laser itself. This is primarily due to inductance associated with the connecting lines, although utility plumbing and cabling also play an important role in this requirement. At the same time, in order to accomplish this in a convenient manner, it has been necessary to design the operating equipment so that it is smaller and lighter than heretofore provided. This includes smaller and lighter weight switch and power supply units, pulsed power units and computers. These smaller and lighter weight components, like the laser itself and the larger and heavier operating equipment, are readily providable in the art and do not form part of the present invention, other than in combination with the overall packaging arrangement to be described hereinafter.

SUMMARY OF THE INVENTION

In view of the foregoing, it is an object of the present invention to provide a modularized packaging arrangement for one or more copper vapo lasers and particularly an arrangement which is uncomplicated in design.

As will be described in more detail hereinafter, the packaging arrangement disclosed herein is one which includes a single container, at least one copper vapor laser disposed within the container, along with all of the necessary operating equipment to operate the laser, except for a primary supply of electrical power, water, and neon, each of which is also necessary to the operation of the laser. This packaging arrangement also includes means adapted to direct power from its primary supply, water and neon into the container for use by the laser and associated equipment. In a particular embodiment, the copper vapor laser is one which utilizes a switch and power supply unit, pulsed power unit and a computer, all three of which are located within the container. The container may be filled with freon or other suitable coolant for cooling the components within the container that must be cooled or those components may be individually cooled.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the invention and, together with the description, serve to explain the principles of the invention.

DETAILED DESCRIPTION OF THE INVENTION

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
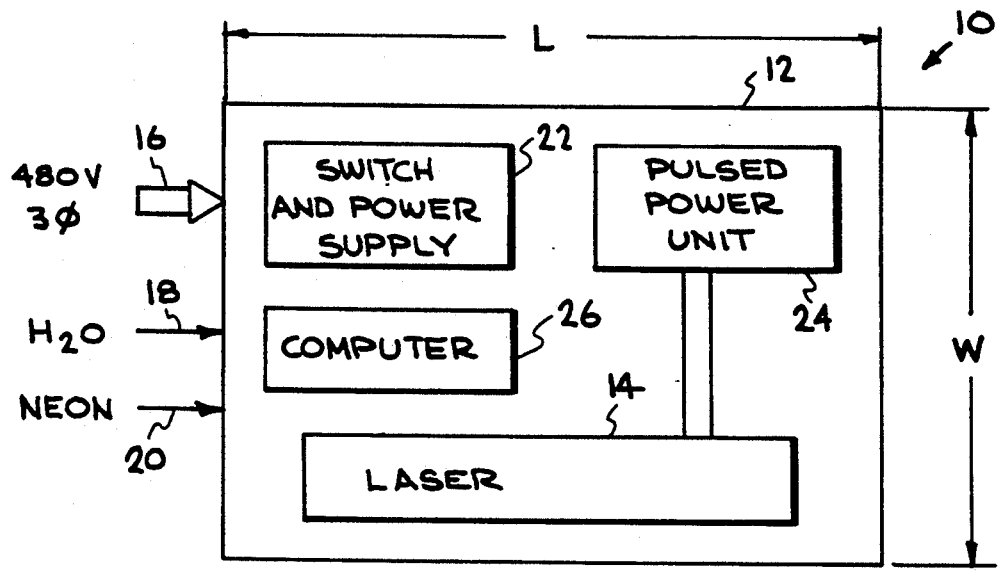
FIG. 1 is a diagrammatic illustration, in the form of a block diagram, of a modularized copper vapor laser arrangement or assembly designed in accordance with the present invention.

Turning now to the drawing, attention is first directed to FIG. 1 which illustrates an overall modularized copper vapor laser assembly designed in accordance with the present invention. This assembly is generally indicated by the reference numeral 10 and includes a container 12 constructed of any suitable material, for example, aluminum. While the present invention is not limited to the particular size or shape of container 12, in a preferred embodiment, is rectangular having a lengthwise dimension L which is 16 feet, a widthwise dimension W which is 4 feet and a thickness (into paper) which is 2 feet.

As shown in FIG. 1, assembly 10 includes a copper vapor laser 14 of the type which requires electrical power, water and neon. The laser itself is located entirely within the container. A source of power, for example three-phase, 480 volt AC power, is located outside the container along with a supply of water and neon, as indicated by arrows 16, 18 and 20, respectively.

The actual means for directing the electrical power, water and neon into the container, for example electrical wiring and suitable plumbing, can be provided through cooperating openings, sealed if necessary, through the container.

Except for electrical power, water and neon, container 12 includes all of the necessary cooperating equipment to operate laser 14 so as to produce the desired copper vapor laser beam. These include, but are not necessarily limited to, a switch and power supply unit 22, a pulsed power unit 24, and a computer 26. While not illustrated, these components are interconnected to one another in the appropriate manner. It is to be understood and reiterated that these components and the other required operating components and the laser itself are not new per se from a functional standpoint and each can be readily provided by those with ordinary skill in the art to which the present invention pertains. Each of the components requiring cooling can be cooled conventionally by its own separate means which may also be readily provided. On the other hand, the entire container may be filled with freon or other suitable and compatible coolant which would serve not only as a coolant but also as a dielectric insulation, thereby preventing arcing between components.

While not shown, container 12 would, of course, include an outlet for the laser beam itself and the means for connecting the container with power, water and neon and could include readily providable plug-in type of means rather than cooperating openings.

Figure 2:
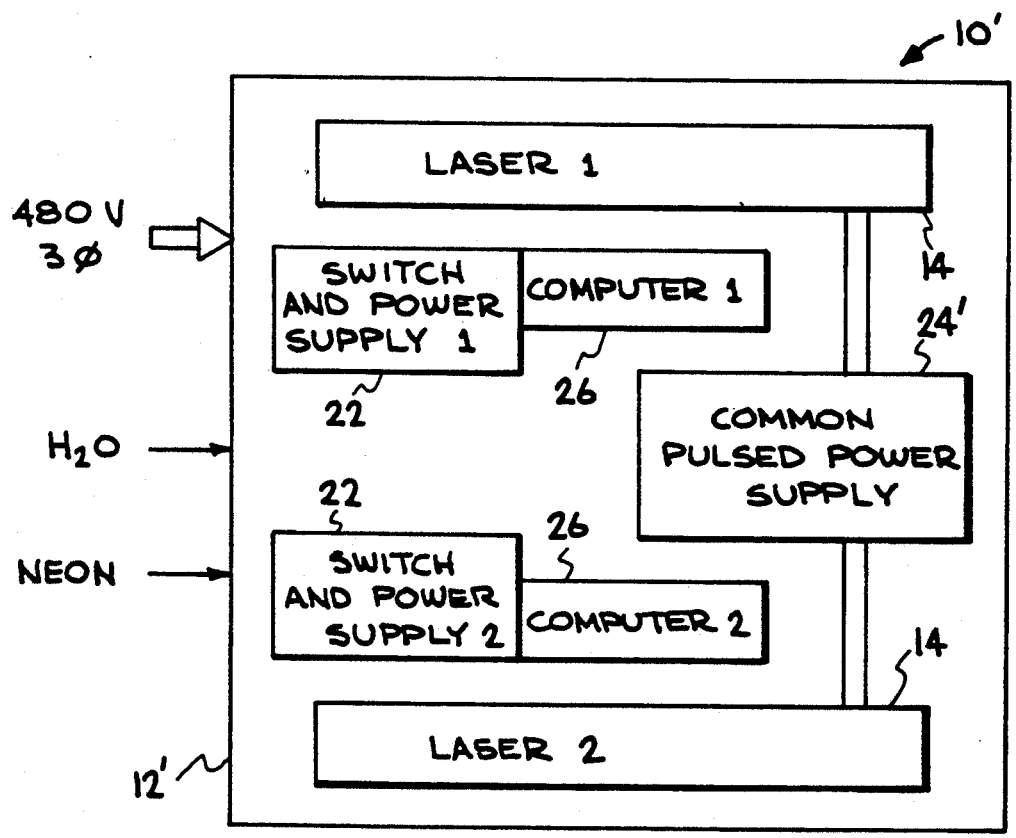
FIG. 2 is a similar view of a modified arrangement or assembly designed in accordance with the present invention.

Turning to FIG. 2, a modified assembly 10' is illustrated. This assembly may be identical to assembly 10, with certain exceptions. Specifically, rather than a single laser 14, the container 12' forming part of the overall assembly includes two such lasers 14 along with their own individual switch and power supply units 22 and computers 26 and a common pulsed power unit 24'. There may be separate cooperating inputs for power, water and neon to each laser or single inputs could be provided with means in the container for dividing the power, water and neon between the two lasers and associated equipment within the container itself.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A modularized copper vapor laser assembly, comprising:

a container module for compactly housing a copper vapor laser generating means of the type which requires electrical power, water and neon and other equipment necessary to operate said laser generating means, said other equipment including a laser switch and power supply unit, a pulsed power unit, and a laser controlling computer means in order to produce a predetermined copper vapor laser beam, said copper vapor laser generating means and said other equipment to operate the laser generating means being wholly disposed within said container module, except for a primary supply of electrical power, water and neon; and means for directing electrical power, water and neon from said primary supply from outside said container module into said container module for use by said laser generating means and said other equipment.

2. An assembly according to claim 1 wherein said container module is filled with freon so as to serve as a means for cooling those components within said container module which require cooling.

3. An assembly according to claim 1 wherein said container module is not filled with coolant, rather means are provided within said container module for individually cooling those components which require cooling.

4. An assembly according to claim 1 including a second laser generating means and associated equipment corresponding in function to said other equipment disposed within said container module.

* * * * *